US008652329B2

(12) United States Patent
Jowett

(10) Patent No.: US 8,652,329 B2
(45) Date of Patent: Feb. 18, 2014

(54) SEWAGE NITRATE REMOVAL BY FREE-DRAINING ASPHYXIANT FILTRATION AND CARBON ADDITION

(75) Inventor: E. Craig Jowett, Rockwood (CA)

(73) Assignee: Rowanwood IP Inc., Rockwood, Ontario (CA)

( * ) Notice: Subject to any disclaimer, the term of this patent is extended or adjusted under 35 U.S.C. 154(b) by 238 days.

(21) Appl. No.: 13/131,925

(22) PCT Filed: Nov. 30, 2009

(86) PCT No.: PCT/CA2009/001732
§ 371 (c)(1),
(2), (4) Date: Jun. 27, 2011

(87) PCT Pub. No.: WO2010/063103
PCT Pub. Date: Jun. 10, 2010

(65) Prior Publication Data
US 2012/0085702 A1    Apr. 12, 2012

(30) Foreign Application Priority Data
Dec. 1, 2008 (GB) .................................. 0821880.2

(51) Int. Cl.
*C02F 3/30* (2006.01)
(52) U.S. Cl.
USPC ........ 210/605; 210/617; 210/259; 210/532.2; 210/903
(58) Field of Classification Search
USPC ......... 210/605, 615, 616, 617, 622, 252, 259, 210/903, 532.2
See application file for complete search history.

(56) References Cited

U.S. PATENT DOCUMENTS

| 4,465,594 | A | * | 8/1984 | Laak .............................. 210/151 |
| 4,892,658 | A | * | 1/1990 | Martin et al. ................. 210/617 |
| 5,318,699 | A | | 6/1994 | Robertson et al. |
| 5,330,651 | A | | 7/1994 | Robertson et al. |
| 5,480,583 | A | * | 1/1996 | Rivas et al. ...................... 516/72 |
| 5,578,214 | A | * | 11/1996 | Yamasaki et al. ............. 210/650 |
| 5,707,513 | A | | 1/1998 | Jowett et al. |
| 5,766,454 | A | * | 6/1998 | Cox et al. ....................... 210/150 |
| 5,980,739 | A | | 11/1999 | Jowett et al. |
| 6,063,268 | A | | 5/2000 | Jowett |

(Continued)

FOREIGN PATENT DOCUMENTS

| EP | 601551 A1 * | 6/1994 |
| JP | 58-27696 A * | 2/1983 |
| JP | 64-56195 A * | 3/1989 |

(Continued)

OTHER PUBLICATIONS

Machine-generated English translation of EP 601551, printed May 18, 2013.*

*Primary Examiner* — Fred Prince
(74) *Attorney, Agent, or Firm* — Anthony Asquith Corp

(57) ABSTRACT

In a sewage disposal system, a de-nitrification station is configured as a heap of foam cubes located in an airtight enclosure from which oxygen is excluded. Carbon is added to the incoming nitrified water. The heap of foam cubes is arranged as a free-draining trickle filter, but here under asphyxiant conditions in the enclosure. Anaerobic microbiological reactions reduce the nitrate to nitrogen gas. Effluent from the de-nitrifier is polished by feeding back a fraction of the effluent through the aeration station from which the nitrate water is derived, or a separate polishing station can be provided.

15 Claims, 2 Drawing Sheets

(56) References Cited

U.S. PATENT DOCUMENTS

| | | | |
|---|---|---|---|
| 6,153,094 A | 11/2000 | Jowett | |
| 6,214,229 B1 | 4/2001 | Robertson | |
| 6,926,830 B2 * | 8/2005 | Ho et al. | 210/605 |
| 7,144,509 B2 * | 12/2006 | Boyd et al. | 210/610 |
| 2007/0193949 A1 * | 8/2007 | You et al. | 210/605 |

FOREIGN PATENT DOCUMENTS

| | | | |
|---|---|---|---|
| JP | 6-304593 A | * | 11/1994 |
| JP | 9-206790 A | * | 8/1997 |

* cited by examiner

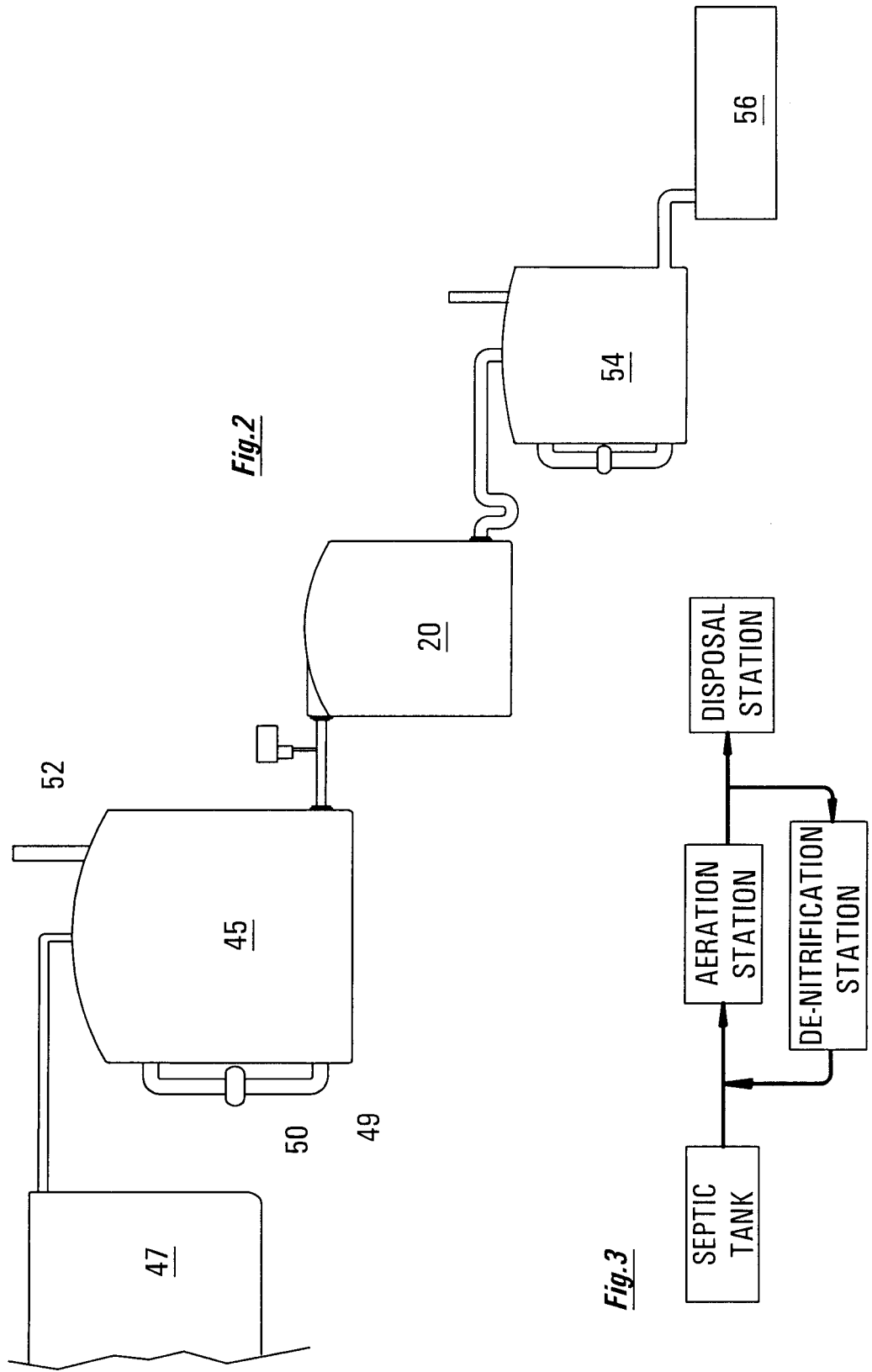

SEWAGE NITRATE REMOVAL BY FREE-DRAINING ASPHYXIANT FILTRATION AND CARBON ADDITION

This invention relates to treatment of wastewater in a sewage treatment system.

It was formerly acceptable to dispose of treated sewage water into the ground, with comparatively large quantities of nitrate dissolved in the water. In the old systems, it was acceptable to dispose of the water in which the ammonium in the water had been more or less nitrified, i.e converted to nitrate. However, large quantities of dissolved nitrate entering a groundwater supply, salt water estuary, etc, can pollute the water. The trend now, in many jurisdictions, is to require that the nitrate be broken down, preferably to nitrogen gas, before the water is infiltrated into the ground.

This specification describes a de-nitrifier, or de-nitrification station, that is suitable to be added to an existing sewage treatment installation. The de-nitrification station can also be included as an element of a new installation.

The de-nitrification station as described herein is suitable for use in small installations. The factors governing what is cost-effective in e.g a municipal sewage treatment plant can be quite different from those governing installations suitable for one or a few residences, or a golf course, or a truckstop, etc, for which municipal sewage treatment is not available. For example, in a small installation, the lay of the land can be critical as to the cost of the installation, and there can be strong resistance on the part of the owners to having to perform regular labour-intensive maintenance routines, while at the same time it is less economical to provide monitoring and automatic control of the processes.

A small installation is defined herein as one that is designed to deal with a maximum of about 200,000 liters of sewage water in a day. Golf courses, truckstops and the like are typically in the range of 20,000 to 50,000 liters per day.

BACKGROUND TO THE INVENTION

Generally, a small sewage treatment and disposal installation includes a primary station, comprising a facility (e.g a septic tank) for procuring digestion-type reactions, usually of an anaerobic character. The water emerges from the primary station with its dissolved nitrogen content primarily now in the form of ammonium.

This ammonium-laden water is collected (e.g in a pipe) and is pumped or otherwise transferred to a (usually-separate) nitrification station. The nitrification station may also be referred to as an aeration station. Here, the water is exposed to air, and the dissolved ammonium ($NH_4+$) is oxidized and transformed into dissolved nitrate ($NO_3-$). Also, some or most of the dissolved carbonaceous-BOD content of the water entering the nitrification station is oxidized and transformed into carbon dioxide.

Traditionally, the aeration station has comprised a tile-bed soakaway, which serves the function, firstly, of providing and ensuring good exposure of the ammonium-laden water to atmospheric air; and secondly, of performing the mechanical function of infiltrating the water into the ground in such manner as not to erode or damage the ground formation, over a service life of many years. These two functions can be regarded as separate, functionally, in that the tile-bed comprises not only the nitrification station but comprises also the water infiltration or injection or disposal station. In many installations, in fact, the disposal station is also separated physically from the aeration station.

If/when it is desired or required to remove the nitrate from the water, a further station is needed, that being a de-nitrification station. Adding a de-nitrification station can be difficult in the traditional tile-bed soakaway system, because the water has to be intercepted, and the de-nitrification station has to be installed, downstream of the tile-bed, i.e after the nitrified water is already in the ground. U.S. Pat. No. 5,318,699 shows one way in which a de-nitrification station has been incorporated into a traditional septic-based sewage treatment system. It will be understood that it would often not be economically feasible to add such a de-nitrification station underneath an existing aeration/nitrification station and disposal station.

Digging a downstream trench to intercept the water can sometimes be done, if the lay of the land enables this to be cost-effective. This can be done especially when the nitrate-laden water is agricultural run-off, and the trench is a drainage ditch alongside the field.

The de-nitrification reaction, i.e. the conversion of dissolved nitrate to a more acceptable form of nitrogen such as nitrogen gas, is a reduction reaction, and requires anoxic conditions. Sometimes, this can be simple; for example, given the presence of a trench or ditch, in that case it might be easy enough to arrange for the reduction reaction to take place underwater, i.e submerged, thereby procuring the required anoxic conditions.

However, generally, in the traditional arrangement in which the aeration station serves also as the disposal station, it is not economically feasible to collect and extract water that is already in the ground, to run that water through a de-nitrification station, and then to put the de-nitrified water back into the ground. Rather, the addition of the de-nitrification station to an existing system will usually only be economical if, in the existing system, the nitrate-laden water is actually contained in, i.e is conveyed in, a conduit such as a pipe. It is recognized that, when the nitrate-laden water is indeed conveyed in a pipe, it is usually easy enough for the designer to arrange the pipe as the inlet for the de-nitrification station.

The de-nitrified water emerging from the de-nitrification station can then be piped or otherwise conveyed to the disposal station—which might include a soakaway of some kind—wherein the water is infiltrated into the ground, discharged into a river or other body of water, etc.

Thus, in an existing installation, it is a simple matter to add a de-nitrification station if the effluent water from the aeration or nitrification station is conveyed in a conduit such as a pipe. Equally, in a new sewage treatment installation, when the installation is to include a de-nitrification station, the designer should see to it that the nitrate-laden effluent water from the nitrification station is conveyed in and contained in a pipe or conduit, so that it is a simple matter to position the de-nitrification station between the nitrification station and the disposal station.

The de-nitrification processes and reactions are micro-biological, and the de-nitrification station should be so engineered as to procure the conditions required to ensure viability of the colonies of appropriate anaerobic bacteria, which can utilize nitrate instead of oxygen.

The de-nitrification station should be airtight, and sealed off from atmospheric oxygen. As mentioned, traditional designers of de-nitrification stations have preferred to procure the required exclusion of oxygen by submerging the de-nitrification station underwater. Conventional de-nitrifiers have relied on excluding oxygen by submergence of the treatment medium in the water being treated, in, for example:

municipal sewage treatment plants; in small (septic-tank-based) sewage treatment installations; and in agricultural run-off facilities.

Also, a source of organic material (i.e carbon) is required for the micro-biological de-nitrification station. In one kind of conventional de-nitrifier, the carbon source has been e.g wood chippings, or the like. In this case, the anaerobic microbe colonies establish themselves on the wood chippings matrix, whereby the matrix within which the bacteria reside is itself consumed by the bacteria—which means that the source has to be replaced after a period of time. It is also conventional to provide the carbon in liquid form, to be injected periodically (or continuously) into the water being treated, and at the same time to provide a matrix of an inert (i.e non-biodegradable) matrix. The systems as described herein utilize carbon in liquid form, which is added as required, and utilize a non-biodegradable matrix or filter medium.

For the purposes of this specification, a "free-draining" body of treatment material is contrasted with a "submerged" body, in that, in a submerged body, the whole body of treatment material remains permanently submerged, throughout operation. In a submerged system, any portion of the treatment material that might lie out of (i.e above) the water would not contribute to treatment.

In a free-draining body of treatment material, by contrast, the water being treated is applied to the top of body or heap of treatment material e.g by being sprinkled or sprayed on top of the body or heap. The body is not submerged in water. In a "free draining" system, however, it is not ruled out that there can be a level or pool of water in the bottom of the container, and that a small portion of the treatment material might be permanently submerged in that pool of water.

Whether a body of treatment material is free-draining or submerged is determined, in many cases, by the height of the water-outlet-port. Basically, if the outlet-port is located below the body, the body is free-draining; if the outlet-port is located above the body, the body is submerged. (However, in some submerged configurations, the level of the water is not determined by height of the outlet-port.) A body of treatment material is said to be "free-draining" if, when water is applied on top of the body, the water travels downwards through the body, under gravity, and then emerges from the bottom of the body.

In the case of a water-outlet-port being located part-way up the height of the body of treatment material, the upper part of the body would be free-draining, and the lower part would be submerged. For present purposes, the free-draining upper part of the body has to be substantial—that is to say, has to be large enough to make a substantial contribution to the water treatment taking place in the body.

Water to be treated can be applied to the body of treatment material in periodic intermittent doses; or alternatively the water can be applied in a continuous stream. The expression "free-draining", as applied to dosed application, does not necessarily mean that the body of material dries out between doses; for example, in the systems described herein, a good deal of water is held up, by capillary action, in the body of absorbent treatment material, between dosings.

THE INVENTION IN RELATION TO THE PRIOR ART

Reference is made, in this specification, to the following prior patent publications:
U.S. Pat. No. 5,030,353 (Stuth, 1991);
U.S. Pat. No. 5,318,699 (Robertson+, 1994);
U.S. Pat. No. 5,980,739 (Jowett+, 1999);
U.S. Pat. No. 6,063,268 (Jowett, 2000);
U.S. Pat. No. 6,153,094 (Jowett+, 2000);
U.S. Pat. No. 6,540,920 (Bounds+, 2003);
U.S. Pat. No. 7,160,460 (Terry, 2007);
U.S. Pat. No. 7,288,192 (Jowett, 2007).

It is known, from U.S. Pat. No. 5,980,739, to provide a trickle filter, for procuring a microbiological nitrification reaction, in which water trickles down through a heap of cubes of plastic foam.

The invention provides an airtight enclosure. The enclosure is sealed to the extent that, during operation, oxygenated air can neither enter nor escape from the enclosure. Nitrate-laden water is conducted into a water-inlet-port of the enclosure. The treated nitrate-free water is conducted out of a water-outlet-port of the enclosure.

Of course, the nitrified water entering the water-inlet-port contains dissolved oxygen, having just been thoroughly aerated. Thus, the microbes that flourish are those that, if free oxygen is present, first consume that free oxygen but then switch to extracting oxygen from the nitrate. Even so, precautions should be taken, at the inlet, that no gaseous (atmospheric) oxygen can enter the interior chamber of the enclosure. Equally, at the outlet, the effluent de-nitrified water preferably should be passed through e.g a P-trap, which again is arranged so that atmospheric air cannot enter the enclosure during operation.

The airtight enclosure is provided with a carbon inlet. Preferably, the carbon is in liquid form, and is injected into the interior chamber of the enclosure. The liquid carbon may include glucose, sucrose, acetate, etc.

Often, the designers will prefer to inject the nitrified water into the water-inlet-port in intermittent doses, rather than in a steady stream. Dosed injection does not necessarily imply that a powered pump must be used, in that sewage water is normally fed into the septic tank in intermittent doses, and this same intermittent characteristic can be continued as the water passes through the treatment stations. The liquid carbon can be injected with the water doses, or can be e.g dripped into the nitrate water at a constant rate. The de-nitrified water can be transferred out of the water-outlet-port of the enclosure either intermittently or continuously.

Inside the enclosure, a body of preferably absorbent treatment material is provided, preferably in the form of e.g seven-centimeter cubes or blocks of plastic foam. The foam should be soft, i.e should be easily squeezable between the fingers, and should be resilient/elastic, in that the foam should quickly regain its nominal size and shape after being squeezed. Preferably, the foam is of the interconnected-cell type, whereby water can pass from cell to cell internally within the block of foam, and whereby the foam is permeable to the through-flow of water.

When the body of absorbent material is in the form of many cubes of plastic foam, the cubes preferably should be cut to shape, and should have sharp corners and edges. The cubes are preferably not moulded into the cube shape. A moulded foam cube might have an outer skin, which might have a different permeability than the interior of the cube inner body.

The enclosure chamber typically is a right cylinder, standing upright. Typically, the cylinder has a diameter of two meters and an axial length of two meters. Such a chamber has a volume of about six cubic meters, or 6,000 liters. A rather larger chamber, with a volume of e.g about 50,000 liters, can be engineered in a shipping container, as described in U.S. Pat. No. 7,288,192.

The foam blocks should be heaped randomly within the enclosure chamber. That is to say, the blocks preferably should not be arranged in neat rows. Heaped randomly, a block typically lies with one of its corners compressed (and thereby flattened) slightly against the (soft) surface of the block below—or with one of the corners of the block below compressed against its surface. As a result, the contact patch between the cubes includes—not just the tip or point of the corner itself—but a larger area surrounding the actual point of the corner. Over this larger area of the contact patch, the two cubes are in rather intimate touching contact, to the extent that water can pass from the interior of one cube into the interior of the cube below, through the contact patch. Thus, the contact patch forms a water-transmitting throat or drainage-bridge, between the two cubes.

The effect of the contact patches between randomly-heaped cubes of soft foam is that the cubes make contact with each other in such manner that water dosed on top of the heap prefers to travel down through the heap of cubes by passing internally inside or within the cubes, and by passing from cube to cube through the respective water-transmitting throats or drainage-bridges. The main tendency is not for the water to travel downwards around the exposed outside surfaces of the cubes—although, inevitably, some of the water does travel downwards that way, with respect to at least one or some of the cubes encountered on the downward journey.

Each water-transmitting drainage-bridge between the cubes restricts the flow of water. That is to say, the resistance to flow is greater in the bridge than within the body of the block. During a dosing episode, water is dosed on top of the topmost cube of the heap, and the water flows through the topmost cube into the cube below, and so on down through the whole heap. (A drop of water might, in passing down through the whole heap, pass through e.g twenty or more cubes.) When dosing ceases, water drains out of the cubes, through the respective drainage-bridges, each cube thereby passing its excess water to the cube below.

Because the drainage-bridge provides a restriction to the downwards passage of water, the capillary action of the absorbent foam of the block causes some of the water to be retained within, i.e inside, the cube. The volume of the remnant of retained water depends on a number of factors, some of which are derived from the configurations of the individual bridges, which in turn depends on how tightly the cubes are pressed together. Although the water-transmitting performance of the individual drainage-bridges might be rather unpredictable, in a typical installation the designer usually finds it easy enough to arrange that the remnant water retained within the cubes, between doses, is, on average, about half the total overall volume of that cube.

The effect of this arrangement is that, between dosings, the water does not drain right out of the foam cubes. Rather, much of the water is physically held up, in the cubes. The effect, in turn, is that it may be regarded that each drop of water travels down the heap in stages, spending some time, between dosings, in the several individual cubes that that drop encounters on its travel down through the whole heap. Thus, the dosed water, instead of draining right out of the heap of cubes between dosings, spends a considerable residence time within the cubes. In fact, the water spends respective small residence time periods consecutively, inside a considerable number of cubes. This type of downwards transference of the water down the whole height of the stack may be referred to as bucket-brigade or champagne-fountain type of water transfer, and the medium may be characterized as a free-draining, water-conducting, and water-retaining, structure.

The effect of the champagne-fountain type of movement is to secure a good aggregate residence time, in which the water resides within the blocks, during which the water is retained consecutively in close proximity to the several colonies of microbes residing in the several cubes. This makes for highly efficient conversion of the nitrate to nitrogen gas.

Another effect of an arrangement that procures the champagne-fountain type of water movement is that the (anaerobic) microbe colonies are indeed established predominantly within, i.e inside, the interiors of the cubes. This may be contrasted with how the microbes would arrange themselves if the water were to pass down the outsides of the cubes—as would be the case if the cubes were made of a non-absorbent hard material, for example, without water-transmitting bridges. In that case, the microbe colonies would establish themselves on the outer surfaces of the cube or block. That being so, as the colonies matured and grew larger, they might be liable to become detached from those outer surfaces. If and when that happened, the debris would settle into the spaces between the cubes below, with the result that the heap would, or might, become clogged.

It has been found that a heap of foam blocks or cubes, arranged randomly within an enclosed sealed chamber, as described herein, is not only highly efficient at converting nitrate in the water to nitrogen, but such arrangement can be expected to remain operationally effective over a service life of many years, without clogging.

It is pointed out that the structure as disclosed in U.S. Pat. No. 6,063,268 functions, as disclosed, as a nitrification or aeration station, and that structure procures a champagne-fountain type of downwards passage of the water. A structure like that could be made suitable for use as a de-nitrification station if it were placed inside an airtight enclosure, from which oxygen is excluded, and if the water fed onto the heap of cubes were water that has been already aerated and fully nitrified.

The beneficial aspects of procuring the champagne-fountain type of downwards passage of the water, predominantly internally within the blocks of foam, is described above as it relates to cubes of soft plastic foam. It will be understood that these same aspects still apply when the filter medium is in some other form, and/or some other material. The requirement as to form and material is that the elements should be absorbent, and should be configured to provide drainage-bridges through which water can to travel downwards through the stack of absorbent elements. Examples of suitable other configurations and materials for the filter medium are described in U.S. Pat. No. 6,063,268, to which attention is directed.

DETAILED DESCRIPTION OF PREFERRED EMBODIMENTS

The technology will now be further described with reference to the accompanying drawings, in which:

FIG. 2 shows the arrangement of the main elements of the installation.

FIG. 3 is a diagram showing another arrangement of the main elements.

Figure 1:
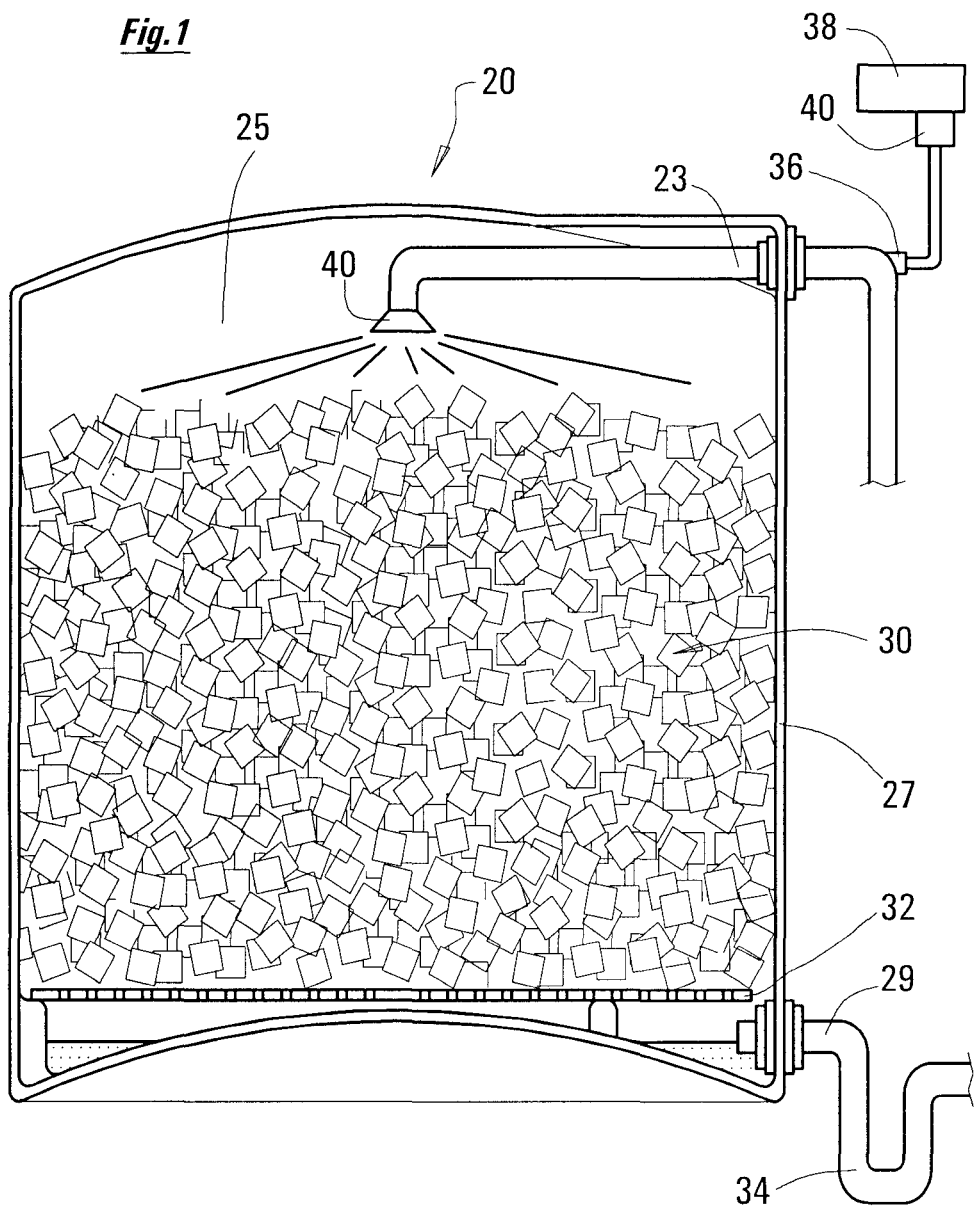
FIG. 1 is a cross-section of a de-nitrification station of a sewage water treatment installation.

The scope of the patent protection sought herein is defined by the accompanying claims. The apparatuses and procedures shown in the accompanying drawings and described herein are examples.

The de-nitrification station 20 illustrated in FIG. 1 includes a water-inlet-port 23, through which aerated/nitrified water is received, and conveyed into an interior chamber 25 defined inside an enclosure 27. Water that has passed through the de-nitrification station 20 is transferred out of the station 20 though a water-outlet-port 29.

A heap 30 of hundreds of seven-cm cubes of plastic foam is housed within the chamber 25. The cubes rest on each other and on a grid 32.

The chamber 25 should be airtight. The (moulded plastic) enclosure 27 is airtight in itself, and the water ports 23,29 are sealed to the walls of the enclosure. The designer and the installation technician should take such steps (which may be conventional engineering steps) as are necessary to ensure that atmospheric air is prevented from entering the chamber. The degree of sealing need not be absolutely perfect: that is to say, the microbiological processes taking place inside the chamber can cope with a small quantity of oxygen—indeed, the water entering the chamber through the water-inlet-port 23 is fully aerated and is saturated with dissolved oxygen gas, and the processes can cope with that. However, the processes have to remove any oxygen that is present in the enclosure (i.e present in the enclosure in a more accessible form than the oxygen in the nitrate) before the nitrate reduction reactions can proceed, and the greater the quantity of more-accessible oxygen that is present, the greater the drain on the efficiency of the de-nitrification process.

During initial start-up of the de-nitrification station, the enclosure will usually be full of air. The oxygen content of this initial air must be disposed of before the anaerobic de-nitrification reactions can take place, and this takes a few days. It is not generally required that the station needs to be inoculated with the required bacteria, during start-up, since they are naturally present in sewage water.

The designer and technician should be mindful, in their particular enclosure 27, of any and all locations at which air might enter the chamber 25, and should see to it that air is excluded. For example, the water-outlet-port 29 should be configured to provide a P-trap 34, so that air cannot enter that way.

Provision is made, at a carbon-inlet-port 36, for carbon to be injected into the chamber 25. A carbon reservoir 38 and an injector 40, are provided for this purpose. In the drawings, the carbon is injected directly into the incoming water, but it could be injected separately into the chamber 25, if desired. Again, precautions should be taken to ensure that no air (i.e no oxygen) is introduced along with the carbon.

In operation, the incoming nitrified aerated water passes through a distribution nozzle 43, which is arranged to spread the water evenly over the heap 30 of foam cubes. The water trickles down through the heap 30, undergoing de-nitrification treatment as it passes down the heap. The water drips down into the bottom of the enclosure 27 through openings in supporting grid 32, and the now de-nitrified water is collected in the water-outlet-port 29.

Sometimes, the lay of the land permits water to pass right through the whole water treatment system by gravity. Usually, however, one or more powered pumps are required to move the water from station to station. Especially when powered pumps are provided, the designers may prefer to move the water in periodic doses, rather than as a continuous stream.

Under the right redox and pH conditions, the nitrogen released from the nitrate in the water is in the form of nitrogen gas. Oxygen is extracted from the nitrate and combines with the supplied carbon, to form carbon dioxide gas. The gases are released into the enclosed chamber 25, whereby the pressure inside the chamber rises—although the quantities are so small that the pressure rise is negligible. However, if it were necessary for the chamber to be vented, to release excess pressure, that might be a problem in that the vent would be another possible point at which oxygen might inadvertently enter the chamber. However, it is recognized that venting is (usually) not necessary. The rate at which a gas enters solution in water depends on the gas pressure, and the pressure in the chamber will not rise above the pressure at which the water can absorb and dissolve all the excess gas. It is recognized that, because the released quantities of nitrogen and carbon dioxide gases are not large, the pressure at which this happens is well within the mechanical capability of the plastic enclosure structure 27.

The carbon needed by the colonies of aerobic microbes is supplied to the de-nitrification chamber on an ongoing or continual basis. A supply reservoir of carbon is required, which must be replenished from time to time. The carbon in the reservoir 38 preferably is in liquid form, for ease of (automated) injection. As far as the microbiological reactions are concerned, carbon can be assimilated in a very wide variety of forms, and other-than-liquid forms are not ruled out in the present technology. One convenient liquid form of carbon is liquid sugar. Another is ethanol. A third is septic-tank-effluent, which often has a high carbon content.

A monosaccharide carbohydrate (glucose) liquid was tested and gave good performance as to de-nitrification, but it led to some clogging of the dosing pump. A disaccharide carbohydrate (sucrose) liquid also performed well, and was acceptable in other respects. A potassium acetate liquid also performed well in all respects, but was much more expensive than the sucrose.

Ideally, the nitrogen in the water entering the de-nitrifier should be already completely transformed into nitrate, leaving no ammonium. If there is any ammonium still present, it will simply pass straight through the de-nitrifier without modification. Ideally also, just enough carbon is supplied to transform all the nitrate to nitrogen gas. If excess carbon were to be supplied, it would remain in the effluent water as BOD. In many jurisdictions, water cannot be discharged if its BOD content is higher than a permitted threshold. On the other hand, if not enough carbon is supplied, some of the dissolved nitrate will remain as nitrate, and again the effluent water cannot be discharged if the nitrate is above the permitted threshold.

Theoretically, it might be possible to monitor the amount of nitrogen in the sewage; and thereby also to control the operation of the nitrification (aeration) station appropriately such that all the ammonium content is transformed into nitrate; and also to monitor and control the amount of added carbon to be just sufficient to eliminate all the nitrate from the effluent water, but not to add any BOD. However, in practical terms, such monitoring and control is too sophisticated for small scale installations of the kind with which the present technology is concerned.

Fortunately, it is recognized that such tight control is not required in the said small-scale sewage treatment installations. The operators should arrange for excess carbon to be injected into the water entering the de-nitrification station 20. As a result, (substantially) all the nitrate will be treated, but some carbon will be present in the effluent water in the water-outlet-port 29. The effluent water can then be passed through a polisher, whereby the excess carbon is eliminated. Such a polisher can be provided economically—or at any rate, considerably more economically than providing a monitoring and control system, which is capable of supplying just the right amount of carbon.

Preferably, the wastewater being treated is moved through the system in discontinuous doses, over a 24-hour period. Dosing is beneficial particularly in helping to ensure that the nozzle sprays the water evenly over the whole body of absorbent material, and is beneficial in that the supply of liquid carbon can be arranged to add a predetermined charge-volume of carbon, each dose, whereby it becomes simple for the addition of the carbon to be at least semi-automated, and low-maintenance. Adding carbon on an ongoing basis enables the matrix habitat for the microbe colonies to be itself inert. An inert matrix is preferable to a matrix composed of wood chippings, for example, from the standpoint of the long term stability or continuity of performance of the station.

The incorporation will now be considered of the present technology into an existing water treatment installation, which includes a nitrification (aeration) station.

It is noted that, often, in existing installations, the aeration/nitrification station does not completely nitrify the ammonium. This can arise, for example, as a result of usage increases over the years, or of changes in the composition of the sewage water. For example, a change from hard to soft water can cause a significant lowering of the pH of the water in the aeration station, and a consequent lowering of the amount of ammonium that can be, or is, nitrified.

It is not unknown for an existing aeration station to nitrify only perhaps fifty percent of the dissolved ammonium. This can be rectified, sometimes, by instituting a program of adding alkalinity to the water in the aeration station, to buffer the pH. The lowering of the pH arises from the nitrification reaction. In the aeration station, the NH4+ ions react with oxygen to form nitrate NO3− plus water, but also to form hydrogen ions H+, which cause the acidity. If there is nothing in the water to buffer the acidity, the pH might drop below about 6.0, at which the nitrification reaction basically stops. Adding alkalinity buffers the pH, and allows the reaction to proceed. However, as mentioned, many owners are averse to taking on an intensive on-going maintenance task.

FIG. 3 shows an arrangement whereby effluent from the de-nitrification station 20 is fed back into the nitrification station 45. It is recognized that the effluent of the asphyxiant de-nitrification station 20 is a source of alkalinity, and that this alkalinity can be automatically transferred back to the aeration station 45, thereby avoiding the need for an on-going maintenance program. Under the right conditions, this feedback of alkalinity from the de-nitrification station 20 can raise the pH of the water in the aeration station 45, and can cause the proportion of ammonium that is converted to nitrate to go up from fifty percent to, say, seventy-five percent or more, on the basis of increased alkalinity alone.

The alkalinity arises as follows. In the de-nitrification station 20, the carbohydrate reacts (microbiologically) with the dissolved nitrate to form: nitrogen gas; carbon dioxide gas; perhaps some ammonia gas; water; and OH—, which constitutes the said alkalinity. All these products are dissolved in the effluent water, which is simply fed back into the inlet-port of the aeration-station. There, as mentioned, the added alkalinity serves to buffer the pH, and to allow the nitrification reaction to proceed to completion, or near completion, in the aeration station 45.

In FIG. 3, if the de-nitrification station 20 has been over-supplied with excess carbon, the excess carbon will be present (as BOD) in the feedback water that enters the aeration station. Now, the aeration that takes place, as a result of the feedback to the aeration station 45, can be effective to oxidize the carbon (to CO2), and thereby to drive the BOD content down below the permitted threshold. Thus, the water emerging from the de-nitrification station 20 is polished, by being passed back through the aeration station 45.

The feedback arrangement, as in FIG. 3, therefore can be advantageous under certain conditions. On the other hand, in FIG. 3, as shown, some of the water from the aeration station 45 is discharged without passing through the de-nitrification station 20 at all, so the nitrate content of the water discharged from such a feedback installation cannot be driven to very low levels.

In FIG. 2 the stations are arranged on an in-series basis. Effluent sewage water from the septic tank 47 is piped (pumped, usually) into the aeration station 45. The aeration station 45 in FIG. 2 is conventional, being based on, for example, the technologies disclosed in U.S. Pat. No. 6,153, 094 and U.S. Pat. No. 6,063,268. In the aeration station of the present FIG. 2, the foam cubes are housed in a cylindrical plastic container, which is much like the enclosure 27 of the de-nitrification station 20 as described above in relation to FIG. 1. In the aeration station 45, of course, the chamber inside the enclosure is open to the atmosphere. Air pipes 49, with fans 50, are provided to promote air circulation within the enclosure. Vents 52 are provided for admitting and discharging air.

In FIG. 2, effluent water from the aeration station 45, being now nitrified, is piped to the de-nitrification station 20. There, carbon is added, as described, from the reservoir 38 and injector 40, and the de-nitrification reactions take place.

The de-nitrified effluent water from the de-nitrification station 20 is piped to a polishing station 54. Here, the now de-nitrified water is once more aerated, primarily for the purpose of removing whatever excess carbon (BOD) might be present in the water. (Aeration of the water converts the carbon, microbiologically, to carbon dioxide.) The polishing station 54 preferably is configured as a scaled-down version of the aeration station 45. As to sizing, both the de-nitrification station 20 and the polishing station 54 should contain each about half the volume of absorbent material as is contained in the aeration station 45.

As to the size of the cubes used in the aeration station and the de-nitrification station, those used in the de-nitrification station should be rather larger. Thus, where the aeration cubes might be five-centimeter cubes, the de-nitrification cubes should be say seven-centimeter cubes. The aeration cubes should be smaller because of the requirement for air to penetrate through the cubes. In both stations, it is important to provide a large number of cubes—or rather, to provide a large number of drainage-bridges.

In the de-nitrification station 20, it may be regarded that the aerobic microbe colonies establish themselves in the always-present, constantly-replenished, remnant-volumes of water held up (by capillary action) inside the cubes. That being so, the number of colonies may be equated to the number of drainage-bridges, which may be equated in turn to the number of cubes. (This equation is by no means an exact one.) Preferably, the de-nitrification station 20 should be so arranged that the shortest path any drop of water can take, in travelling downwards from inlet to outlet, involves the water passing though at least ten drainage-bridges.

Finally, the treated water is piped to the disposal station 56. Here, the treated water, now acceptably clear of nitrate and BOD, is infiltrated into the ground by means of e.g a soak-away, or is discharged into a stream or other body of water.

The preference has been mentioned that the treatment material should be soft and absorbent. However, it should not be ruled out that the treatment material can be much less absorbent, and indeed can be substantially non-absorbent. For example, a hard plastic medium is shown in U.S. Pat. No. 5,030,353, coir is shown in U.S. Pat. No. 7,160,460, and textile fabric is shown in U.S. Pat. No. 6,540,920. Also, tire chips, gravel, etc have often been used in traditional aerated trickle systems for nitrification, or have been used in traditional submerged biological anoxic filters (BAFs) for de-nitrification.

With these non-absorbent materials, the benefit is lost of utilizing capillary action to create remnant volumes of water that are held up in the medium. The retention time needed for the completion of the biological reactions then is provided e.g by passing the wastewater through the filter medium multiple times.

In a non-absorbent medium, under anoxic conditions, the anaerobic microbes colonize the outer surfaces of the medium, and build up a slime layer. Such slime layers often slough off and sink to the bottom of the container, and remain there as a sludge, which needs to be managed periodically.

However, the anoxic conditions being maintained, the anaerobic de-nitrification reactions can be expected to proceed. Thus, the case should be considered where a trickle filter already exists, which utilizes non-absorbent material, but has hitherto been used for aerobic treatment, e.g for aeration and nitrification of sewage water; such a trickle filter can be converted for use as an anoxic asphyxiated de-nitrification station, often by doing hardly more than enclosing the filter in an airtight chamber, as described.

The following reference numerals are used in this specification:
- 20 de-nitrification station
- 23 water-inlet-port
- 25 interior chamber
- 27 airtight enclosure
- 29 water-outlet-port
- 30 heap of cubes
- 32 support grid
- 34 P-trap
- 36 carbon-inlet-port
- 38 carbon reservoir
- 40 carbon injector
- 43 water distribution nozzle
- 45 nitrification station
- 47 septic tank
- 49 air pipes
- 50 fans
- 52 vents
- 54 polishing station
- 56 disposal station

The invention claimed is:

1. Apparatus for lowering the concentration of dissolved nitrate in wastewater, wherein:
   the apparatus includes a de-nitrification station;
   the de-nitrification station includes a de-nitrification enclosure, which defines a hollow interior chamber;
   the apparatus is so structured and arranged that oxygen is substantially prevented from entering the chamber;
   the enclosure includes a water-inlet-port, through which water is conveyed into the chamber;
   the apparatus includes a volume of biological filter medium, located inside the chamber;
   the material of the filter medium is substantially inert with respect to water, with respect to contaminants present in the wastewater, and with respect to anaerobic microbiological reactions that break down the contaminants;
   the material of the filter medium is porous, absorbent, and capable of retaining water by capillary action;
   the material of the filter medium is permeable to flow of water within and inside the material;
   the apparatus includes a source of carbon, and includes an operable injector which is effective, when operated, to inject the carbon into the chamber;
   the apparatus is so arranged that:
   (a) the water-inlet-port deposits water on top of the volume of filter medium, in such manner that the water trickles down through the volume of medium; and
   (b) the volume of biological filter medium is characterizable as free-draining.

2. As in claim 1, wherein:
   the material of the biological filter medium is in many separate pieces, and the pieces are arranged in a heap or stack, which is located in the chamber;
   in the heap or stack, a contact-patch-portion of an upper one of the pieces is in direct touching contact with a complementary contact-patch-portion of a lower one of the pieces; and
   the apparatus is so arranged that the water from the water-inlet-port travels down through the pieces, and through the contact-patches, progressively, in a champagne-fountain mode of downward movement.

3. As in claim 2, wherein the absorbent material is soft, being of such softness that the material can be easily distorted by being squeezed between the fingers.

4. As in claim 1, wherein the shortest path that a drop of water can take, in passing from the water-inlet-port to a water-outlet-port of the enclosure, involves the water passing through about ten or more of the contact-patches.

5. As in claim 1, wherein:
   the heap or stack is so configured as to have the following characteristic, in respect of the said contact-patch-portions, namely that:
   (a) the respective contact-patch-portions together form a contact-patch between the two pieces;
   (b) the contact-patch is large enough to form a drainage-bridge between the two pieces, through which water in the upper piece can drain from the upper piece into the lower piece;
   (c) the contact patch is small enough to restrict such drainage, to the extent that a substantial remnant volume of water is held retained, by capillary action of the absorbent material, inside the upper piece; and
   the heap or stack is so configured that the rest of the several pieces in the heap form respective pairs of contact-patches, of which at least a major portion have the said characteristic.

6. As in claim 1, wherein:
   the apparatus includes also a nitrification or aeration station, including a nitrification enclosure in which the waste-water is aerated, to the extent that ammonium dissolved in the water is transformed to nitrate;
   the nitrification enclosure includes an outlet-port, for conveying nitrified water out of the nitrification enclosure;
   the nitrification enclosure is physically separate from the de-nitrification enclosure, the two enclosures being arranged in-series, the nitrification enclosure being upstream of the de-nitrification enclosure;
   the apparatus is so arranged that water entering the water-inlet-port of the de-nitrification station is effluent water from the outlet-port of the aeration station, containing dissolved nitrate; and
   the nitrogen content of the nitrate in the effluent water from the aeration station is twenty milligrams of nitrogen, or more, per liter of the water.

7. As in claim 6, wherein the effluent water from the aeration station is conveyed in a pipe to the water-inlet-port of the de-nitrification station.

8. As in claim 6, wherein:
the apparatus includes also a septic tank; and
water entering the aeration station is effluent water from the septic tank, containing dissolved ammonium.

9. As in claim 6, wherein:
the apparatus includes also a polishing station, in which water is aerated, to the extent that carbon dissolved in the water is transformed to carbon dioxide; and
water entering the polishing station is effluent water from the de-nitrification station, containing dissolved carbon.

10. As in claim 6, wherein:
the apparatus is arranged for removing excess dissolved carbon in the effluent water from the de-nitrification station by aerating the said effluent water;
in that a portion of the effluent water from the de-nitrification station is fed back into the aeration station.

11. As in claim 6, wherein the apparatus is part of a small sewage treatment installation, which is sized to nitrify, and to de-nitrify, a through-put of no more than about 200,000 liters of sewage per day.

12. As in claim 1, wherein the carbon injected into the nitrate-laden water in the de-nitrification station is a liquid sugar.

13. As in claim 1, wherein:
the de-nitrification station includes a nozzle or nozzles, through which nitrate-laden water entering the de-nitrification station is sprinkled or sprayed evenly over the volume of filter medium; and
the water is sprinkled or sprayed in intermittent or discontinuous doses.

14. As in claim 1, wherein:
the enclosure includes a water-outlet-port; and
the apparatus is so arranged that the water, having trickled down through the volume of filter medium, collects in, and is conveyed away via, the water-outlet-port.

15. Procedure for lowering the concentration of dissolved nitrate in water, including:
sprinkling or spraying nitrate-laden water on top of a volume of biological filter medium;
arranging the volume in such manner that the water trickles downwards through the volume, in a manner that can be characterized as free-draining;
the material of the filter medium being substantially inert with respect to water, with respect to contaminants present in the wastewater, and with respect to anaerobic microbiological reactions that break down the nitrate;
the material of the filter medium is porous, absorbent, and capable of retaining water by capillary action;
the material of the filter medium is permeable to flow of water within and inside the material;
ensuring that the volume is substantially not exposed to oxygen, being oxygen in a form that would be more readily accessible, to anaerobic bacteria, than nitrate;
injecting carbon into the nitrate-laden water; and
ensuring that conditions of redox and pH in the water are such as to promote anaerobic microbiological reactions that reduce the nitrate to nitrogen gas.

* * * * *